US012097509B2

(12) United States Patent
Mu et al.

(10) Patent No.: US 12,097,509 B2
(45) Date of Patent: Sep. 24, 2024

(54) FLUE PIPE SYSTEMS AND METHODS OF PURIFYING FLUE GASES

(71) Applicant: Rheem Manufacturing Company, Atlanta, GA (US)

(72) Inventors: Baojie Mu, Fort Smith, AR (US); Pratik S. Deokar, Dallas, TX (US)

(73) Assignee: Rheem Manufacturing Company, Atlanta, GA (US)

( * ) Notice: Subject to any disclaimer, the term of this patent is extended or adjusted under 35 U.S.C. 154(b) by 332 days.

(21) Appl. No.: 17/545,214

(22) Filed: Dec. 8, 2021

(65) Prior Publication Data

US 2023/0173505 A1 Jun. 8, 2023

(51) Int. Cl.

*B03C 3/01* (2006.01)
*B03C 3/019* (2006.01)
*B03C 3/04* (2006.01)
*B03C 3/38* (2006.01)
*F23J 15/02* (2006.01)
*F24H 9/00* (2022.01)

(52) U.S. Cl.

CPC ................ *B03C 3/019* (2013.01); *B03C 3/04* (2013.01); *B03C 3/38* (2013.01); *F23J 15/025* (2013.01); *F24H 9/0036* (2013.01); *F23J 2215/10* (2013.01); *F23J 2215/20* (2013.01)

(58) Field of Classification Search

CPC .............. B03C 3/019; B03C 3/04; B03C 3/38
See application file for complete search history.

(56) References Cited

U.S. PATENT DOCUMENTS 4,695,358 A 9/1987 Mizuno et al.
5,879,154 A 3/1999 Suchovsky
6,761,134 B1 7/2004 Trant
(Continued)

FOREIGN PATENT DOCUMENTS

JP H04108534 A * 4/1992

OTHER PUBLICATIONS

Mazumder, et al., (2011). "Two-Stage Electrohydrodynamic Gas Pump in a Square Channel". In Proceedings of the ESA Annual Meeting on Electrostatics. pp. 1-12).
(Continued)

*Primary Examiner* — Robert A Hopkins
(74) *Attorney, Agent, or Firm* — Eversheds Sutherland (US) LLP

(57) ABSTRACT

Disclosed herein is a flue pipe system comprising a flue pipe, a first electrode, a second electrode, a third electrode, and a voltage supply. The flue pipe can define a fluid flow path through an interior volume of the flue pipe. The voltage supply can be connected to the first electrode, the second electrode, and the third electrode. The voltage supply can form a first electrical circuit comprising the voltage supply, the first electrode, and the third electrode and a second electrical circuit comprising the voltage supply, the second electrode, and the third electrode. The first electrical circuit can form a streamer corona discharge between the first electrode and the third electrode in the interior volume such that the fluid flow path flows therethrough. The second electrical circuit can form a flow of ions between the second electrode and the third electrode along the interior surface of the flue pipe.

20 Claims, 8 Drawing Sheets

(56) References Cited

U.S. PATENT DOCUMENTS

| | | | |
|---|---|---|---|
| 6,994,056 B1 | 2/2006 | Boros |
| 7,040,258 B2 | 5/2006 | Peart et al. |
| 11,480,392 B2 | 10/2022 | Farley et al. |
| 2022/0034593 A1 | 2/2022 | Zou et al. |
| 2022/0042706 A1 | 2/2022 | Farley |
| 2022/0042707 A1 | 2/2022 | Farley et al. |
| 2022/0057026 A1 | 2/2022 | Farley et al. |
| 2023/0072821 A1 | 3/2023 | Farley et al. |

OTHER PUBLICATIONS

Billings, et al. (1958). "Simultaneous Removal of Acid Gases, Mists, and Fumes with Mineral Wool Filters". Journal of the Air Pollution Control Association. vol. 8(3), pp. 185-202.

* cited by examiner

FLUE PIPE SYSTEMS AND METHODS OF PURIFYING FLUE GASES

FIELD OF THE DISCLOSURE

The present disclosure relates generally to flue pipe systems. Particularly, examples of the present disclosure relate to systems and methods of purifying combustion flue gases in flue pipes.

BACKGROUND

Water heaters are generally used to provide a supply of hot water and can be used in a number of different residential, commercial, and industrial applications. A water heater can supply heated water to a number of different processes. For example, a water heater in a residential dwelling can be used for an automatic clothes washer, an automatic dishwasher, one or more showers, and one or more sink faucets. Traditional energy sources, such as combustible matter, are commonly used for such heating purposes (e.g., water heaters and air heaters).

Combustion-type water heaters, however, have a need to emit exhaust and other flue gases when in use, and flue gases emitted after a combustion reaction can be harmful to living creatures and the environment. For example, such pollutants can contribute to the formation of photochemical smog and acid rain and can also be harmful to the human body when inhaled. While certain processes have been developed for decreasing the emission of such pollutants from the flue gas, the existing methods are typically costly to manufacture, install, and/or operate, which limits widespread adoption of these environmentally friendly measures. Moreover, certain existing pollution-reducing measures can negatively impact the heating efficiency of the overall water heater system, which can increase the energy usage of the water heater and/or cause insufficiently heated water to be provided to the demand location.

Therefore, there is a need for energy-efficient and/or cost-effective systems and methods to remove harmful pollutants from flue gases emitted from combustion-type water heaters.

SUMMARY

These problems are addressed by the disclosed technology, as are other needs that will become apparent upon reading the description below in conjunction with the drawings. The present disclosure relates generally to flue pipe systems. Particularly, examples of the present disclosure relate to systems and methods of purifying combustion flue gases in flue pipes. The disclosed technology can be useful in any application involving a flue, such as water heating and/or air heating applications, as non-limiting examples.

Disclosed herein is a flue pipe system comprising a flue pipe, a first electrode, a second electrode, a third electrode, and a voltage supply. The first electrode, the second electrode, and the third electrode can comprise a first conductive material, a second conductive material, and a third conductive material, respectively. The flue pipe can comprise a nonconductive material, and the flue pipe can define a fluid flow path through an interior volume of the flue pipe. The flue pipe can have an interior surface defining the interior volume and an exterior surface opposite the interior surface.

The first electrode can be contained in the interior volume and be parallel to at least a portion of the fluid flow path. The second electrode can be disposed on at least a portion of the interior surface of the flue pipe. The third electrode can be disposed on at least a portion of the interior surface of the flue pipe and connected to a grounding point.

The voltage supply can be connected to the first electrode and the second electrode. The voltage supply can form a first electrical circuit comprising the voltage supply, the first electrode, and the third electrode and a second electrical circuit comprising the voltage supply, the second electrode, and the third electrode.

A flue gas can be configured to flow along the fluid flow path through the interior volume, and the flue gas can comprise one or more of an oxide, a dioxide, or a trioxide. The one or more of the oxide, the dioxide, or the trioxide can comprise one or more of nitrogen oxides or sulfur oxides.

The first electrical circuit can form a streamer corona discharge between the first electrode and the third electrode in the interior volume such that the fluid flow path flows therethrough. The flue gas can interact with the streamer corona discharge to create an aerosol mist.

The second electrical circuit can form a flow of ions between the second electrode and the third electrode along the interior surface of the flue pipe. The flue gas can interact with the flow of ions along the interior surface.

The flue pipe system can further comprise a particle filter disposed in the interior volume of the flue pipe such that the fluid flow path is configured to flow therethrough. The particle filter can comprise a mineral wool. The particle filter can be configured to entrap an aerosol mist, and the mineral wool can be configured to neutralize an acidic fluid.

Also disclosed herein are methods of purifying a flue gas utilizing the same.

These and other aspects of the disclosed technology are described herein along with the accompanying figures. Other aspects, features, and elements of the disclosed technology will become apparent to those of ordinary skill in the art upon reviewing the following description of specific examples of the disclosed technology. While features of the disclosed technology may be discussed relative to certain examples and figures, the disclosed technology can include one or more of the features or elements discussed herein. Further, while one or more examples may be discussed as having certain advantageous features, one or more of such features may also be used with the various other examples of the disclosure discussed herein. In similar fashion, while certain examples, implementations, and embodiments may be discussed below with respect to a given device, system, or method, it is to be understood that such examples can be implemented in various other devices, systems, and methods of the present disclosure.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

DETAILED DESCRIPTION

Figure 1:
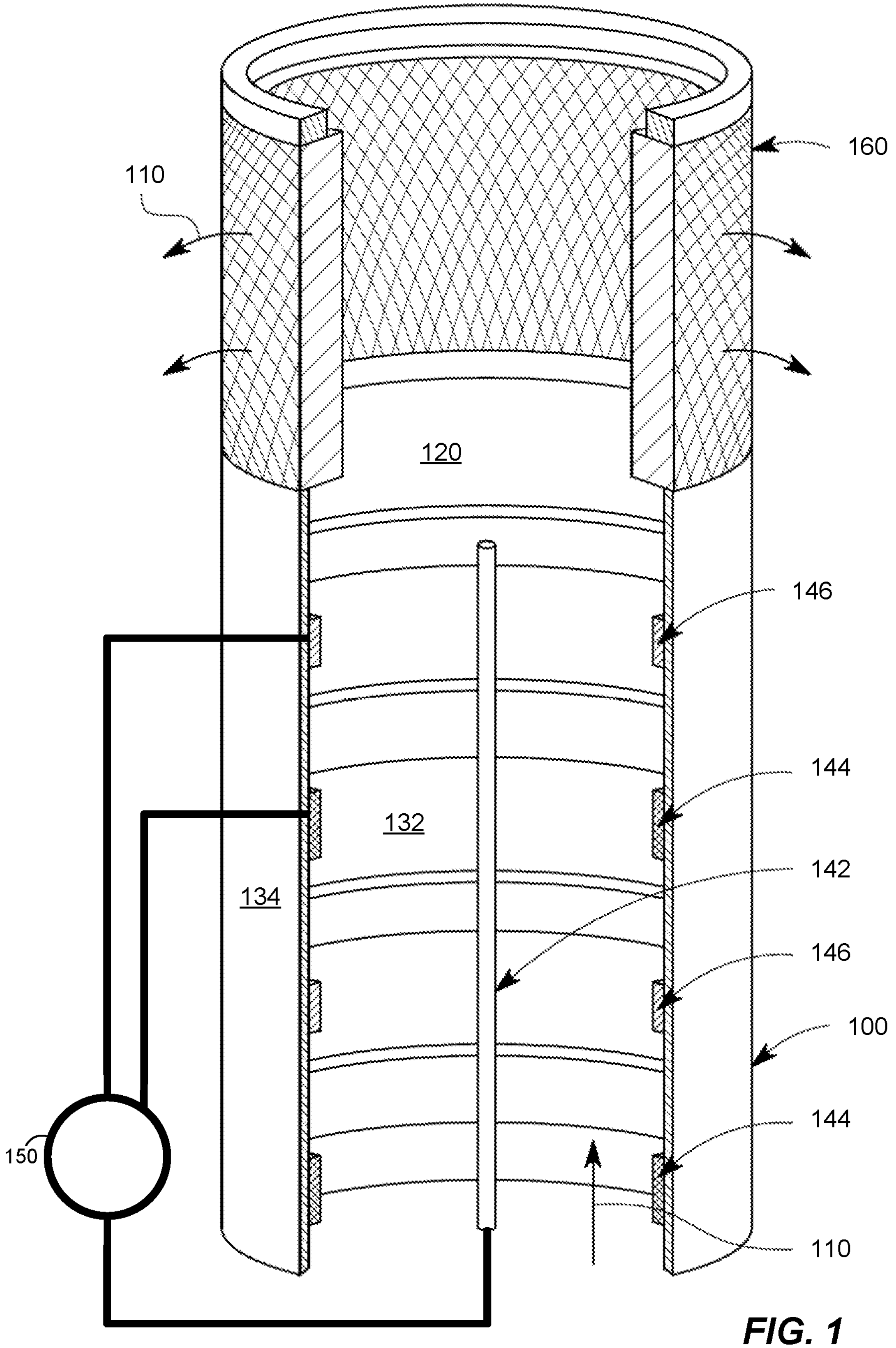
FIG. 1 illustrates an isometric cross-sectional view of a flue pipe system, in accordance with the present disclosure.

In general, the present disclosure relates to systems and methods of purifying combustion flue gases in flue pipes. The disclosed flue pipe systems can comprise a flue pipe, a first electrode, a second electrode, a third electrode, and a voltage supply. The flue pipe can define a fluid flow path through an interior volume of the flue pipe. The voltage supply can be connected to the first electrode, the second electrode, and the third electrode. The voltage supply can form a first electrical circuit comprising the voltage supply, the first electrode, and the third electrode and a second electrical circuit comprising the voltage supply, the second electrode, and the third electrode. The first electrical circuit can form a streamer corona discharge between the first electrode and the third electrode in the interior volume such that the fluid flow path flows therethrough. The second electrical circuit can form a flow of ions between the second electrode and the third electrode along the interior surface of the flue pipe.

As stated above, a problem with current flue pipe systems is the emission of exhaust and other flue gases when in use with a combustion-type heating system (e.g., water heating, air heating). Flue gases emitted after a combustion reaction in furnaces (e.g., natural gas-fired furnaces, coal-fired furnaces, wood-fired furnaces, oil-fired furnaces, petroleum fuel-fired furnaces) can be harmful to living creatures and the environment. Such pollutants can contribute to the formation of photochemical smog and acid rain and can also be harmful to the human body when inhaled. Specifically, $NO_x$ and $SO_2$ are emitted in flue gas after the combustion of fuel heating furnaces and water heaters. The $NO_x$ emissions are harmful to living creatures and the environment and are therefore controlled through standards. Due to increased regulations on harmful emissions and the ubiquity of combustion-type heaters, the disclosed technology can greatly expand the design space and increase the energy efficiency of such systems.

The disclosed technology can use a pulsed streamer corona discharge to convert $SO_2$ and $NO_x$ from flue gases into an acid mist and particle aerosols. The pulsed streamer corona discharge can operate at small periods of high voltage pulses. The streamer discharge can be formed by applying a voltage to an electrode for a short duration period (e.g., about 200 ns). The short duration of the pulse can prevent spark breakdown, which could consume more power and energy. Electrons ejected in the form of streamers can create active species and ions through inelastic collisions with the flue gas molecules, and the active species (especially the hydroxyl radical, $^{\bullet}OH$) can promote a chemical reaction to convert $NO_x$ and $SO_2$ molecules into acids. Therefore, the disclosed technology can offer an improved conversion rate when compared to similar ion-based reactions. Ions are typically about 500 times slower than the electrons. Therefore, the current between the electrode in the flue gas volume is mostly due to electron streamers with short pulses. This increases the rate of formation of active species and reduces power consumption.

Upon the complete conversion of the flue gases to acid mist and particle aerosols using the pulsed streamer corona discharge, the process can continue to scrub and neutralize the acid mist and particle aerosols before the gases are released to the environment. Glass wool and mineral wool filters can be used to remove the acid mist and particle aerosols through several mechanisms, such as Brownian diffusion, impaction, and interception. The filter material can be placed at the end of the flue pipe while allowing for a larger flow area to reduce the pressure drop in the flue pipe. Slag wool (mineral wool), which is an inexpensive material used in filter applications, has shown to simultaneously remove acid mist and particle aerosols. This slag wool can allow for an acid-base reaction at the fiber surface, where the basic (high pH) CaO, MgO, NaO or $K_2O$ in the mineral fibers can leach out of the filter in presence of moisture and neutralize the acid mist to form salts at the fiber surface.

Although certain examples of the disclosure are explained in detail, it is to be understood that other examples or applications of the disclosed technology are contemplated. Accordingly, it is not intended that the disclosure is limited in its scope to the details of construction and arrangement of components set forth in the following description or illustrated in the drawings. Other examples or applications of the disclosure are capable of being practiced or carried out in various ways. Also, in describing the examples, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

Ranges described as being between a first value and a second value are inclusive of the first and second values, as well as all values therebetween. Likewise, ranges described as being from a first value and to a second value are inclusive of the first and second values, as well as all values therebetween.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Reference will now be made in detail to examples of the disclosed technology, such as those illustrated in the accompanying drawings. Wherever convenient, the same references numbers will be used throughout the drawings to refer to the same or like parts.

FIG. 1 illustrates a flue pipe system 100 in accordance with the present disclosure. By way of illustration and not limitation, the flue pipe system 100 in FIG. 1 is illustrated as a vertical, cylindrical flue pipe. However, it is to be understood that the flue pipe system 100 can be used in conjunction with any type of flue pipe known to those of ordinary skill in the art without departing from the spirit of the present disclosure. Furthermore, the flue pipe system 100 can be provided in any orientation, such as vertical (as shown), horizontal, or inclined.

As shown, the flue pipe system 100 can define a fluid flow path 110 through the interior volume 120 of the flue pipe system 100. The flue pipe system 100 can also have an interior surface 132 which defines the interior volume 120 and an exterior surface 134 opposite the interior surface. The flue pipe system 100 can further comprise a first electrode 142, a second electrode 144, a third electrode 146, and a voltage supply 150 electrically connected to each of the first electrode 142, the second electrode 144, and the third electrode 146.

As shown, the first electrode 142 can be located in the interior volume 120. The first electrode can be positioned in the interior volume 120 such that the first electrode 142 is parallel to at least a portion of the fluid flow path 110. Alternatively, or in addition, the first electrode 142 can be positioned in the interior volume 120 such that the first electrode 142 and the interior volume 120 share a longitudinal axis. In other words, the first electrode 142 can be positioned in the center of the interior volume 120. The second electrode 144 can be disposed on at least a portion of the interior surface 132 of the flue pipe system 100. The second electrode 144 can be at least partially circumferentially disposed on the interior surface 132 such that the second electrode 144, along with the interior surface 132, defines the interior volume 120. The third electrode 146 can be disposed on at least a portion of the interior surface 132 of the flue pipe system 100. The third electrode 146 can be at least partially circumferentially disposed on the interior surface 132 such that the third electrode 146, along with the interior surface 132, defines the interior volume 120.

Figure 2:
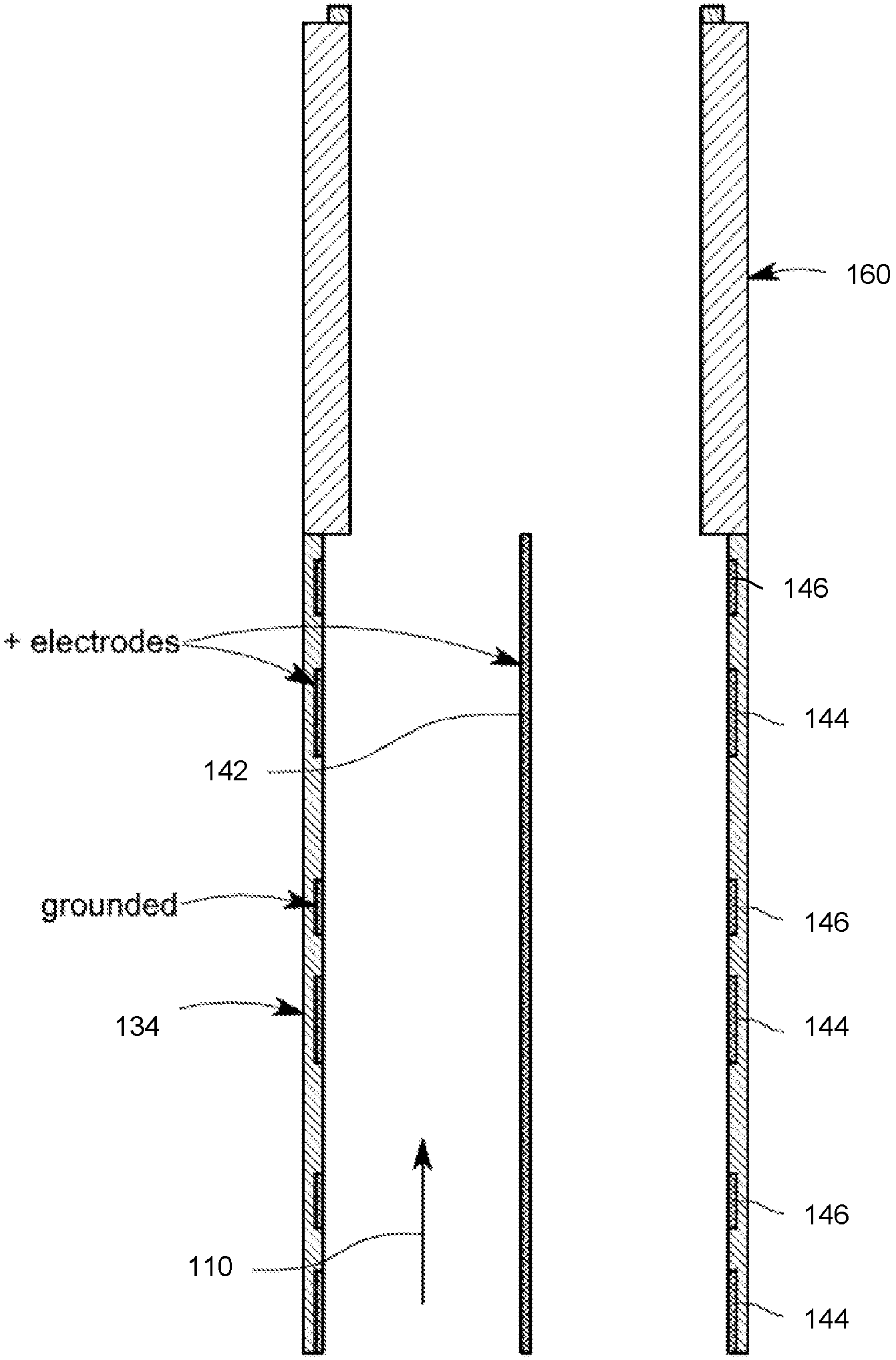
FIG. 2 illustrates a side cross-sectional view of a flue pipe system, in accordance with the present disclosure.

The flue pipe system 100 can include any number of first electrodes 142, any number of second electrodes 144, and any number of third electrodes 146 as desired. For instance, as shown in FIG. 1, the flue pipe system 100 can include a single first electrode 142, two second electrodes 144, and two third electrodes 146. By way of another example, as shown in FIG. 2, the flue pipe system 100 can include a single first electrode 142, three second electrodes 144, and three third electrodes 146. For ease of discussion, the first, second, and third electrodes 142, 144, 146 are commonly referenced in singular form herein, but it is to be understood that the disclosed technology includes any number of first, second, and/or third electrodes 142, 144, 146.

Figure 3:
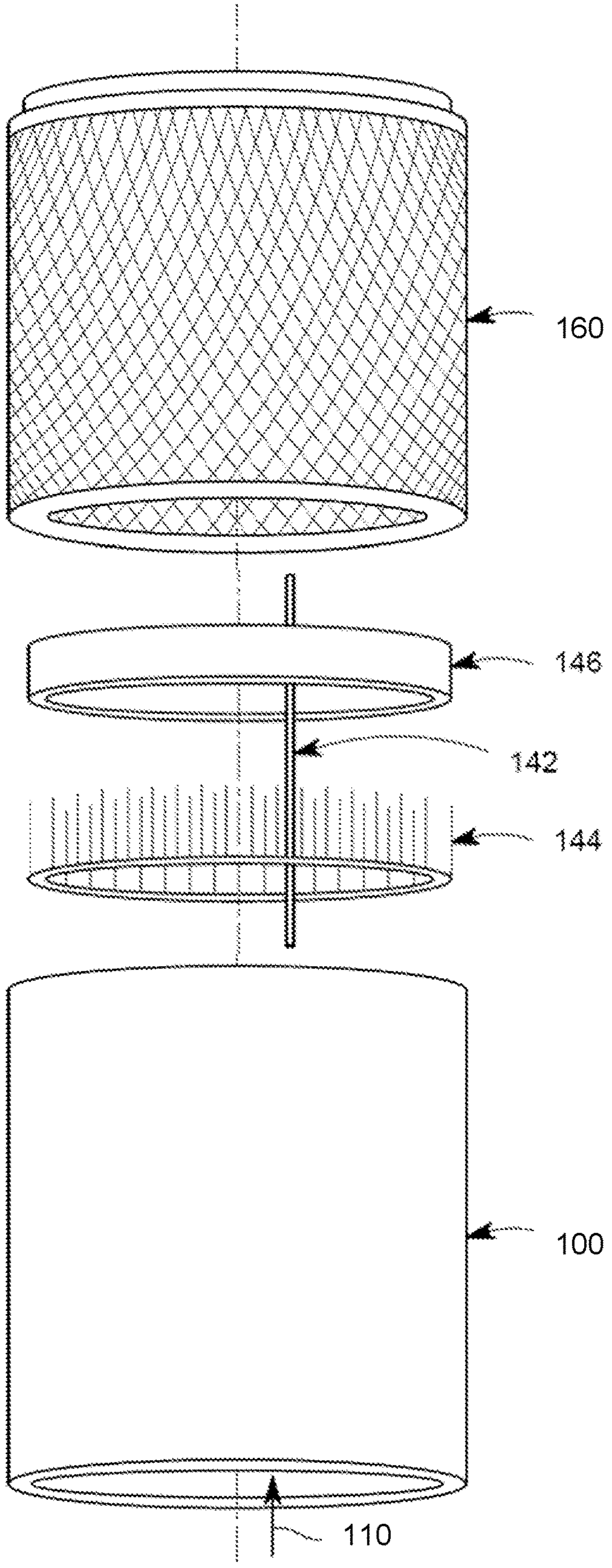
FIG. 3 illustrates an exploded view of a flue pipe system, in accordance with the present disclosure.

Additionally, the first electrode 142, the second electrode 144, and the third electrode 146 can be configured in a variety of shapes and/or geometries as desired. For instance, the first electrode 142 can comprise a generally rod-like or elongated shape. The second electrode 144 and/or the third electrode 146 can comprise a generally annular shape. Furthermore, the second electrode 144 and/or the third electrode 146 can be continuous in shape (e.g., a complete annulus about the circumference of the interior surface 132) or segmented about the interior volume 120. Moreover, multiple discrete electrodes can be arranged to form a desired shape. For example, FIG. 3 illustrates multiple individual electrodes arranged to form a generally annular second electrode 144. Additionally, the shape of the second electrode 144 and the third electrode 146 can have shapes such that the shape of the second electrode 144 is different from the shape of the third electrode 146. The respective shapes of the second electrode 144 and the third electrode 146 can be asymmetrical when compared to each other. For example, as shown, the second electrode 144 can have a comb-like shape (e.g., with an annular base) and the third electrode 146 can be an annulus, and both are asymmetrical with each other and with the first electrode 142, which is a rod. The comb-like shape can include an annular base and a plurality of prongs extending orthogonally from the annular base and parallel to the interior surface 132. The plurality of prongs can be flush with the interior surface 132.

As described above, the voltage supply 150 can be electrically connected to each of the first electrode 142 and the second electrode 144. The voltage supply 150 can be configured to form a first electrical circuit and a second electrical circuit. The first electrical circuit and the second electrical circuit can be electrically distinct and separate. That is to say, electrons can be prevented from flowing between the first electrical circuit and the second electrical circuit. Alternatively, the first electrical circuit and the second electrical circuit can at least partially overlap and/or share portions of each through which electrons can flow.

Furthermore, the third electrode 146 can be connected to a grounding point. In other words, the third electrode 146 can be a ground electrode. In such a manner, the third electrode 146 can help to complete the first electrical circuit and the second electrical circuit. The grounding point need not necessarily be connected to an electrical ground. The third electrode 146 can have an electric potential lower than the first electrode 142 and the second electrode 144. Alternatively, the third electrode 146 can have an electric potential higher than the first electrode 142 and the second electrode 144.

The first electrical circuit can comprise the voltage supply 150, the first electrode 142, and the third electrode 146. The second electrical circuit can comprise the voltage supply 150, the second electrode 144, and the third electrode 146. The first electrical circuit can form a streamer corona discharge between the first electrode 142 and the third electrode 144 in the interior volume 120. The second electrical circuit can form a flow of ions between the second electrode 144 and the third electrode 146 along the interior surface 132 of the flue pipe system 100. The polarity of the voltage supply 150 can be altered to create any desired potential and/or polarity. Indeed, the polarity and/or the potential of the voltage supply 150 can be variable.

The flue pipe system 100 can be configured to direct a flow of flue gas along the fluid flow path 110 through the interior volume 120 of the flue pipe system 100. The flue gas can comprise one or more of an oxide or a dioxide. The oxide or the dioxide can include a nitrogen oxide and/or a sulfur dioxide. For instance, the flue gas can comprise one or more components in the form of $NO_x$ and $SO_2$ molecules.

When the flue gas flows through the interior volume 120, the flue gas can interact with the streamer corona discharge between the first electrode 142 and the third electrode 146. The interaction can cause the flue gas to form an aerosol mist. The aerosol mist can comprise one or more of an acid mist and/or aerosol particulates. The streamer corona discharge operates at small periods of high voltage pulses. The streamer discharge is formed by applying a voltage from the voltage supply 150 to first electrode 142 for a short duration period (e.g., about 200 ns). The short duration of the pulse prevents a spark breakdown, which would consume more power.

The pulsed streamer discharge can occur from about 1 ns to about 10 μs (e.g., from 10 ns to 1 μs, from 50 ns to 900 ns, from 100 ns to 800 ns, from 200 ns to 700 ns, from 300 ns to 600 ns, from 400 ns to 500 ns, from 1 ns to 900 ns, from 1 ns to 800 ns, from 1 ns to 700 ns, from 1 ns to 600 ns, from 1 ns to 500 ns, from 1 ns to 400 ns, from 1 ns to 300 ns, or from 1 ns to 200 ns).

The pulse frequency can be from about 0.5 Hz to about 20 Hz (e.g., from 1 Hz to 19 Hz, from 2 Hz to 18 Hz, from 3 Hz to 17 Hz, from 4 Hz to 16 Hz, from 5 Hz to 15 Hz, from 6 Hz to 14 Hz, from 7 Hz to 13 Hz, from 8 Hz to 12 Hz, from 9 Hz to 11 Hz, from 10 Hz to 20 Hz, from 11 Hz to 20 Hz, from 12 Hz to 20 Hz, from 13 Hz to 20 Hz, from 14 Hz to 20 Hz, from 15 Hz to 20 Hz, from 0.5 Hz to 10 Hz, from 0.5 Hz to 9 Hz, from 0.5 Hz to 8 Hz, from 0.5 Hz to 7 Hz, from 0.5 Hz to 6 Hz, or from 0.5 Hz to 5 Hz).

The peak voltage provided by the voltage supply 150 can be from about 1 kV to about 500 kV (e.g., from 10 kV to 500 kV, from 50 kV to 500 kV, from 100 kV to 500 kV, from 1 kV to 400 kV, from 1 kV to 300 kV, from 1 kV to 200 kV, or from 1 kV to 100 kV).

The pulse rise time can be from about 100 V/ns to about 100 kV/ns (e.g., from 200 V/ns to 100 kV/ns, from 300 V/ns to 100 kV/ns, from 400 V/ns to 100 kV/ns, from 500 V/ns to 100 kV/ns, from 600 V/ns to 100 kV/ns, from 700 V/ns to 100 kV/ns, from 800 V/ns to 100 kV/ns, from 900 V/ns to 100 kV/ns, or from 1 kV/ns to 100 kV/ns).

Electrons ejected in the form of streamers can create active species and ions through inelastic collisions with the flue gas molecules. The active species (especially a hydroxyl radical, $^{\bullet}OH$) can promote the chemical reaction to convert $NO_x$ and $SO_2$ molecules into acids.

Furthermore, the flue gas can interact with the flow of ions along the interior surface 132 between the second electrode 144 and the third electrode 146. This flow of ions can create an electrohydrodynamic flow. Based on the polarity of the second electrode 144 and the third electrode 146, the ions flow from the second electrode 144 to the third electrode 146 (and in a direction parallel to the fluid flow path, and therefore the flue gas flow). In such a manner, the flow of ions can effectively reduce the skin friction at the interior surface 132 and increase the flow rate of the flue gas in the flue pipe system 100. Therefore, the flow of ions can reduce the overall pressure drop in the flue pipe system and eliminate the need for induced or forced draft fans to encourage flue gas flow and/or reduce the size of induced or forced draft fans.

The first electrode 142, the second electrode 144, and the third electrode 146 can each comprise a conductive material. Each of the first electrode 142, the second electrode 144, and the third electrode 146 can comprise a separate and/or distinct conductive material. Alternatively, some or all of the first electrode 142, the second electrode 144, and the third electrode 146 can comprise the same (or a similar) conductive material. In contrast, the flue pipe system 100 can be made from a nonconductive material such that the flue pipe system 100 is isolated from the electrical circuits formed by the first electrode 142, the second electrode 144, and the third electrode 146. Suitable examples of a nonconductive material can include, but are not limited to, rubbers, plastics, or other polymers (such as polyvinyl chloride).

Suitable examples of a conductive material can include, but are not limited to, metals, metal oxides, carbon, carbon nanostructure, group 3 through 12 transition metals (such as copper, silver, gold, titanium, platinum, and the like), other metals (such as aluminum, tin, lead, and the like), metal alloys, semiconductors, or any combination thereof. Suitable examples of a nonconductive material can include, but are not limited to, plastics (such as polyvinyl chloride, polyethylene terephthalate, polypropylene, and the like), polymers, rubber, and combinations thereof.

The flue pipe system 100 can also comprise a particle filter 160. The particle filter 160 can be at least partially disposed in the interior volume 120 of the flue pipe system 100. The particle filter 160 can be positioned such that the fluid flow path 110 is configured to flow therethrough. The particle filter 160 can comprise a mineral wool configured to neutralize an acidic fluid. Alternatively, or in addition, the particle filter 160 can be configured to entrap an aerosol mist. In such a manner, the particle filter 160 can entrap and/or neutralize the aerosol mist created by the flue gas interacting with the streamer corona discharge.

The particle filter 160 can comprise a variety of materials. Glass wool and mineral wool filters can be used to remove the acid mist and particle aerosols through several mechanisms, such as Brownian diffusion, impaction, and interception. The particle filter 160 can be placed at the end of the flue pipe while allowing for a larger flow area to reduce the pressure drop in the flue pipe. Slag wool (mineral wool), which is an inexpensive material used in filter applications, has shown to simultaneously remove acid mist and particle aerosols. This slag wool can allow for an acid-base reaction at the fiber surface, where the basic (high pH) CaO, MgO, NaO or $K_2O$ in the mineral fibers can leach out of the filter in presence of moisture and neutralize the acid mist to form salts at the fiber surface.

As shown, the particle filter 160 can be positioned such that the exterior surface of the particle filter 160 forms a continuous exterior surface with the exterior surface 134 of the flue pipe system 100. In such a manner, the converted flue gas can flow from the fluid flow path 110 in the interior volume 120, through the particle filter 160, and out of the exterior surface 134 of the flue pipe system. Alternatively, the particle filter 160 can be positioned within the interior volume 120. In such a manner, the converted flue gas can flow through the particle filter 160 and continue through the interior volume 120 of the flue pipe system 100. Additionally, the particle filter 160 can have an end cap forming a seal with the exterior surface 134 of the flue pipe system 100. In such a manner, the converted flue gas can be prevented from escaping and forced through the particle filter 160. The end cap can comprise a non-permeable material and a gasket to prevent the flow of flue gas therethrough. Alternatively, the end cap can comprise the same material, or a material substantially similar to, the particle filter 160. In such a manner, flue gas passing through the end cap can still be converted by the particle filter 160.

Although the particle filter 160 is illustrated as having a cylindrical geometry, it is understood that the particle filter 160 can have various geometries and sizes as desired by those of ordinary skill in the art. For example, the particle filter 160 can have a planar geometry spanning the interior volume 120 perpendicular to the fluid flow path 110. The particle filter 160 can also have various sizes. For instance, the particle filter 160 can be sized such that the particle filter 160 fits entirely within the interior volume 120. In the case of a cylindrical particle filter 160, as shown, the flue gas can flow through the center of the particle filter 160 along a longitudinal axis that is parallel to the fluid flow path 110. The flue gas can then pass through the particle filter 160 sides and back into the interior volume 120 to continue on through the flue pipe system 100.

FIG. 2 illustrates a side cross-sectional view of the flue pipe system 100. As shown, the first electrode 142 can be contained in the interior volume 120. The first electrode can be positioned in the interior volume 120 such that the first electrode 142 is parallel to at least a portion of the fluid flow path 110. Alternatively, or in addition, the first electrode 142 can be positioned in the interior volume 120 such that the first electrode 142 and the interior volume 120 share a longitudinal axis. In other words, the first electrode 142 can be positioned in the center of the interior volume 120.

Figure 4:
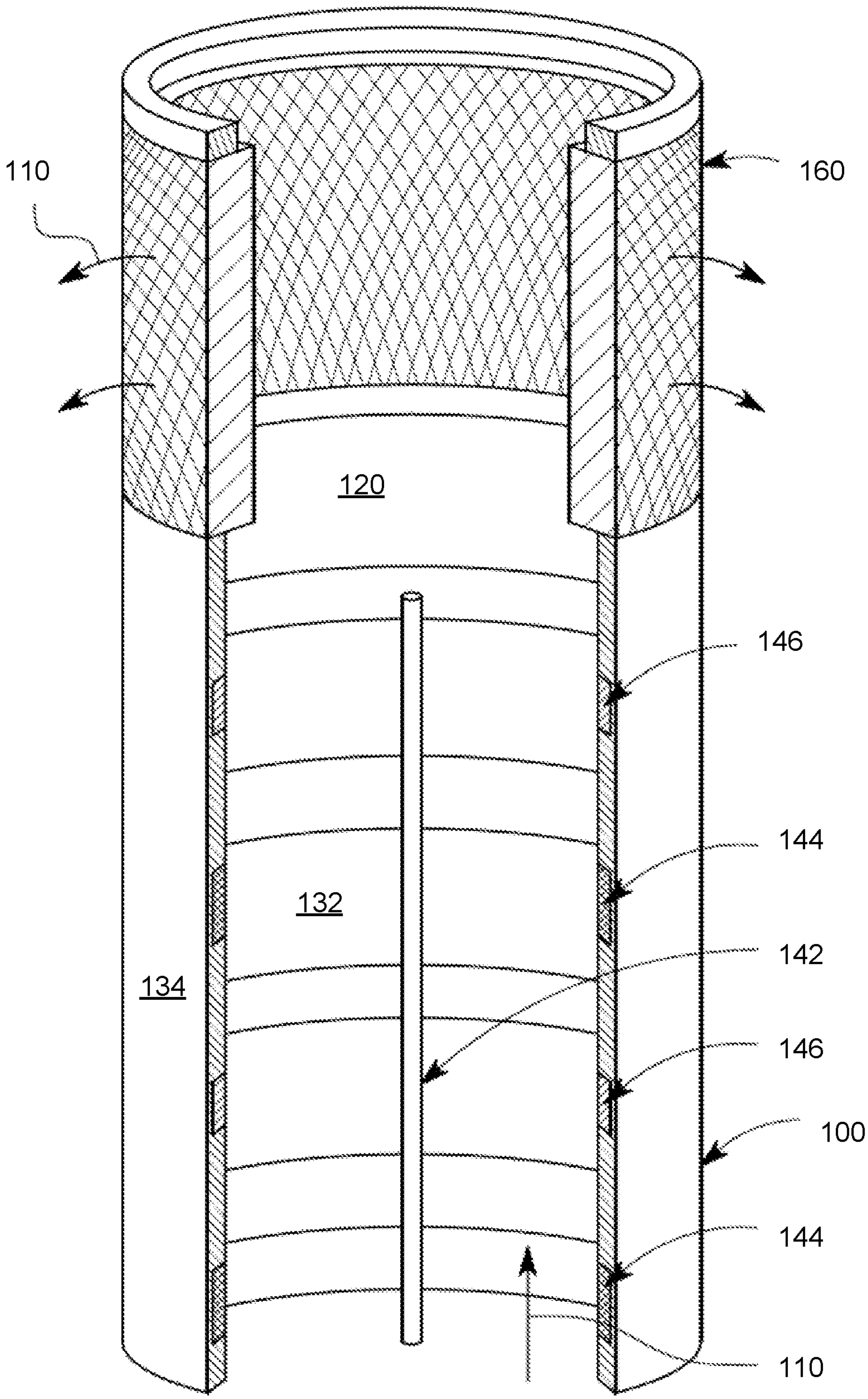
FIG. 4 illustrates an isometric cross-sectional view of a flue pipe system, in accordance with the present disclosure.

The second electrode 144 can be disposed on at least a portion of the interior surface 132 of the flue pipe system 100. The second electrode 144 can be at least partially circumferentially disposed on the interior surface 132 such that the second electrode 144, along with the interior surface 132, defines the interior volume 120. The third electrode 146 can be disposed on at least a portion of the interior surface 132 of the flue pipe system 100. The third electrode 146 can be at least partially circumferentially disposed on the interior surface 132 such that the third electrode 146, along with the interior surface 132, defines the interior volume 120. Therefore, the second electrode 144 and the third electrode 146 can be flush with the flue pipe system 100 and share an interior surface with the interior surface 132 of the flue pipe system 100. This is additionally illustrated in greater detail in FIG. 4.

In other words, the first electrode 142, the second electrode 144, and the third electrode 146 can be flush with the interior surface 132. If the flue gas contains solid particles such as acid mist and particle aerosols, deposition can occur on the interior surface 132 of the flue pipe system 100 over time. The flush geometry design of flue pipe system 100 with the electrodes can allow for easy cleaning of flue pipe system's 100 interior surface 132 without damaging the electrodes. Additionally, the flushed electrodes can reduce skin friction in the flue pipe system 100.

The geometries of the flue pipe system 100 are shown in greater detail in FIG. 3. As shown, the flue pipe system 100 can have a substantially cylindrical geometry. The second electrode 144 and the third electrode 146 can have a circular geometry to match the geometry of the flue pipe system 100. In such a manner, the second electrode 144 and the third electrode 146 can be flush with the flue pipe system 100 and share an interior surface with the interior surface 132 of the flue pipe system 100. However, it is understood that the second electrode 144 and the third electrode 146 can also have other geometries. For example, the second electrode 144 and the third electrode 146 can be elliptical or rectangular such that the second electrode 144 and the third electrode 146 are asymmetrical to the flue pipe system 100 and to each other.

The particle filter 160 can also have a cylindrical geometry to match the flue pipe system 100. However, as described above, the particle filter 160 can also have other geometries, such as planar, rectangular, ovular, hemispherical, and the like.

Figure 5:
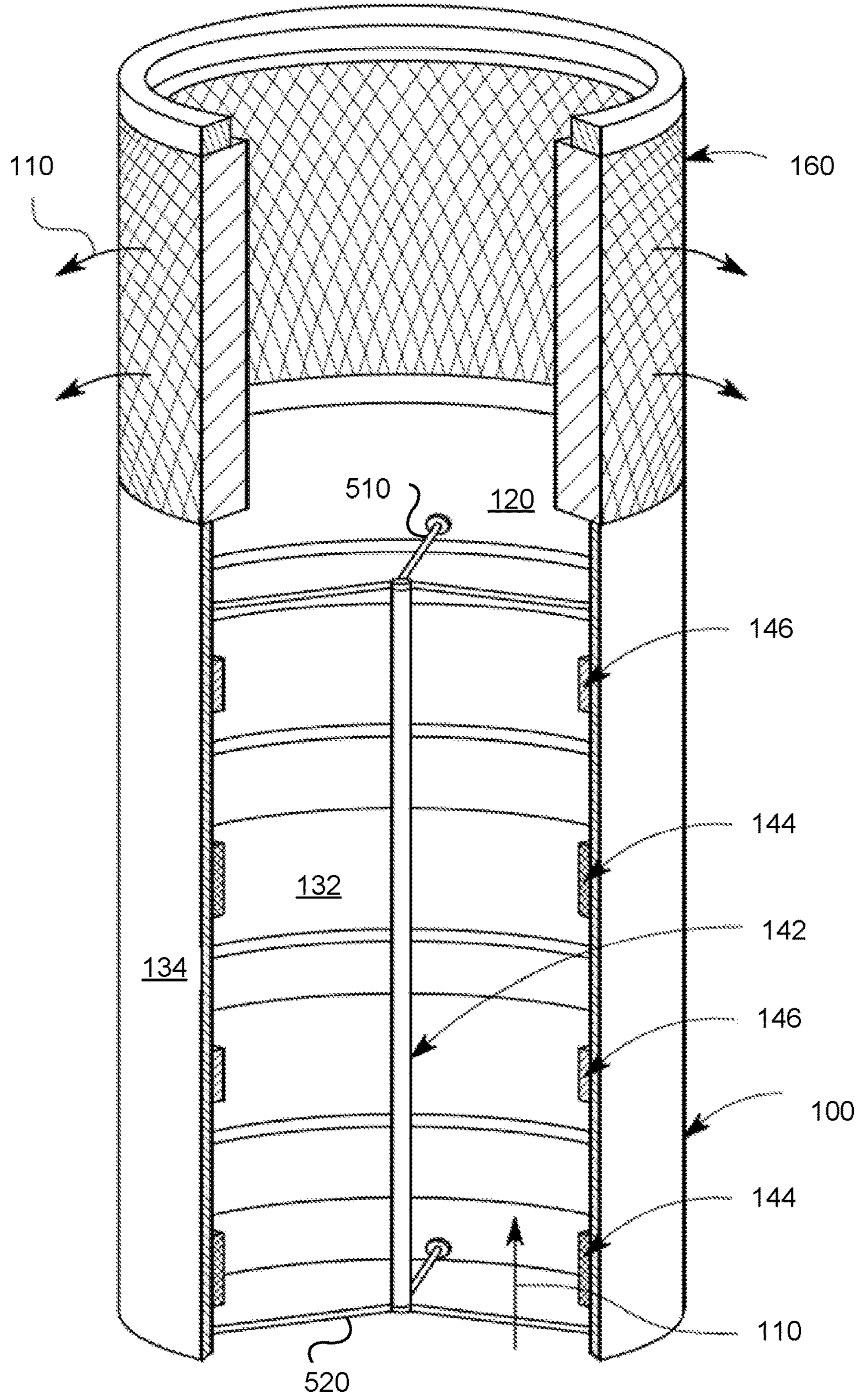
FIG. 5 illustrates an isometric cross-sectional view of a flue pipe system, in accordance with the present disclosure.

As shown in FIG. 5, the flue pipe system 100 can further comprise a support structure. For example, the , the flue pipe system 100 can include a first support structure 510 (e.g., an upper support structure) and/or a second support structure 520 (e.g., a lower support structure) for suspending the first electrode 142 within the interior volume 120. While the flue pipe system 100 is illustrated with both the first support structure 510 and the second support structure 520 in FIG. 5, it is understood that the flue pipe system 100 can function with only one thereof, or neither.

As shown, the first support structure 510 and the second support structure 520 can attach to a first end and a second end of the first electrode 142, respectively. The first support structure 510 and the second support structure 520 can attach the first electrode 142 to the flue pipe system 100 such that the first electrode 142 is securely positioned in the interior volume 120. As such, the first support structure 510 and the second support structure 520 can both comprise a nonconductive material as to not influence the first electrical circuit. However, some portions of the first support structure 510 or the second support structure 520 can comprise a conductive material to aid the connection of the first electrode 142 to the voltage supply 150.

Each of the first support structure 510 and the second support structure 520 can comprise one or more (e.g., two or more, three or more, or four or more) support beams spanning the interior volume 120 from the first electrode 142 to the interior surface 132 of the flue pipe system 100. The support beams can also be fastened to the first electrode 142 and/or the interior surface 130 by a variety of means, such as welding, radio frequency (RF) welding, adhesives, binders, rivets, screws, nails, staples, and the like.

Figure 6:
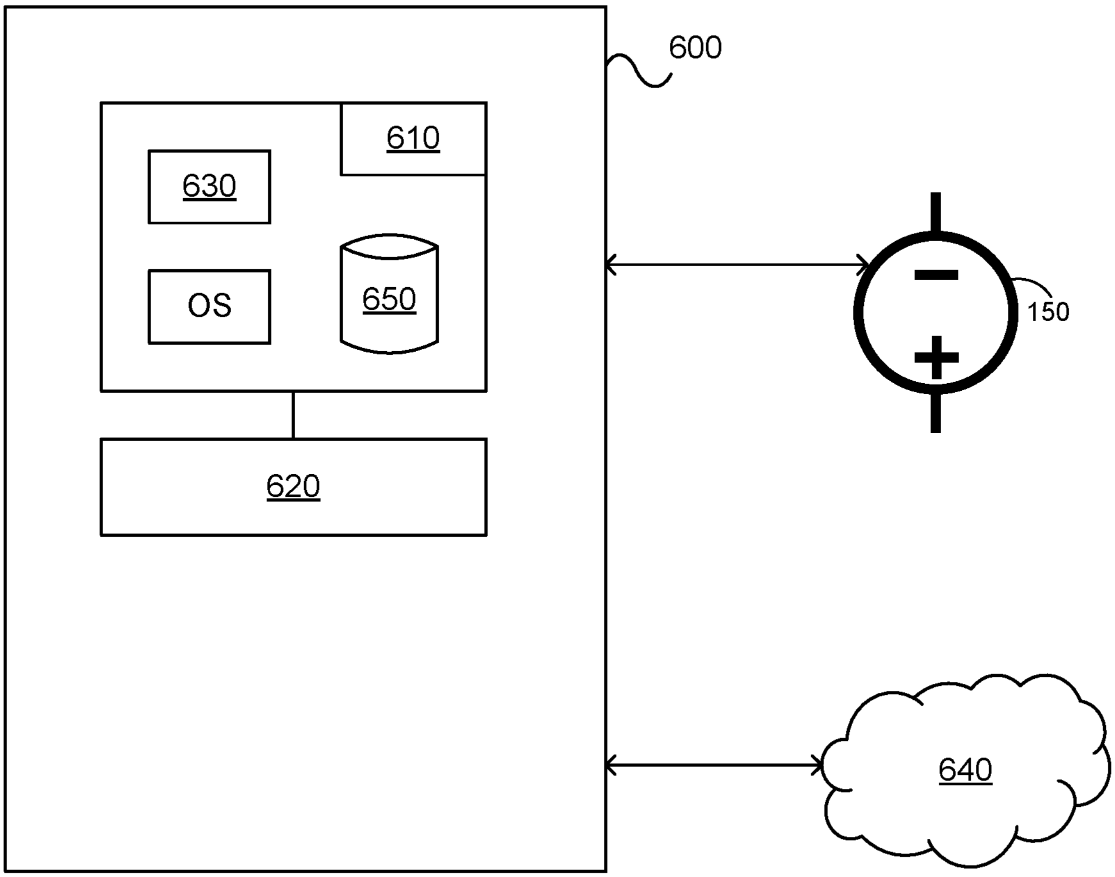
FIG. 6 illustrates a component diagram of a controller for a flue pipe system, in accordance with the present disclosure.

The flue pipe system can further comprise a controller 600, as illustrated in FIG. 6. The controller 600 can be in communication with systems and components which can generate the flue gas for the flue pipe system (e.g., a water heater or an air heater). As shown, the controller 600 can comprise one or more processors 610, a transceiver 620 in communication with the flue pipe system 100 and the processors 610, and a memory 630 in communication with the one or more processors 610. The components described herein can further be in electrical communication with each other, as well as with other components of the controller 600. The memory 630 can store various instructions, programs, databases, machine learning algorithms, models, and the like, such as an operating system (OS). The memory 630 can communicate with the processors 610 to, for instance, execute programs, store data, communicate with other components, and the like. The processors 610 can also facilitate external communication via the other components of the controller 600. For example, the processors 610 can communicate via the transceiver 620 over a network 640 with various systems, such as a security system or a data logging system. The processors 610, via the transceiver 620, can also be in communication with one or more storage devices 650 for storing datasets, documents, instructions, programs, and the like. The one or more storage devices 650 can also be internally contained in the controller 600, as shown.

The controller 600 can be or include any analog or non-analog controller. For instance, the controller 600 can comprise one or more switches configured to affect desired changes to the flue pipe system 100. In such a manner, the controller 600 can output one or more instructions to be implemented on the system (e.g., the flue pipe system 100) by the controller 600.

Figure 7:
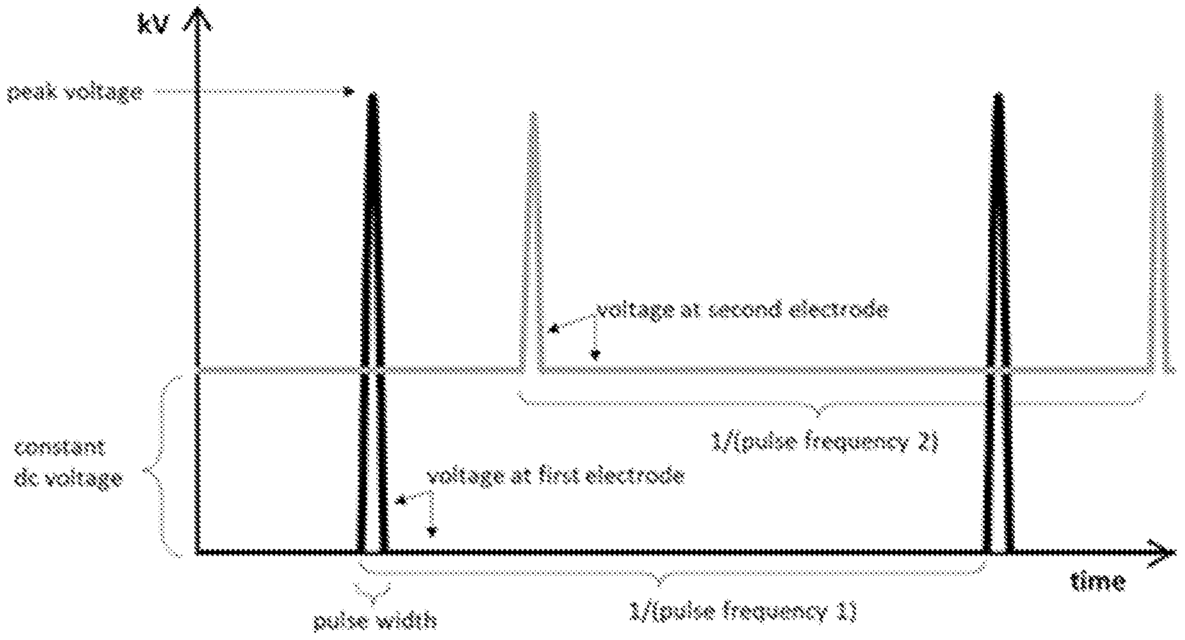
FIG. 7 is a chart showing an electrical pulse for a streamer corona discharge in a flue pipe system, in accordance with the present disclosure.

The controller 600 can be in communication with the first electrical circuit and the second electrical circuit. Therefore, the controller 600 can be in communication with the voltage supply 150, the first electrode 142, the second electrode 144, and the third electrode 146. The time between each pulse to create the streamer corona discharge can be regulated by the controller 600 to maximize the $NO_x$ and $SO_2$ conversion and minimize the current between the electrodes due to ion current. An example of an electrical pulse dictated by the controller 600 to create a streamer corona discharge in the first electrical circuit is shown in FIG. 7.

The controller 600 can be in communication with a flow switch that can sense, for instance, NOx and $SO_2$ content in the flue gas. In response, the controller can also start/stop the voltage supply and optimize the pulsing of voltage spikes. The controller 600 can control the scale of the constant DC voltage supply to the second electrode 144 (shown in FIG. 7) to control the magnitude of the electrohydrodynamic flow. The controller 600 can further optimize the current to create the least amount of deposition of solid particles, acid mist, and particle aerosols on the electrodes.

Figure 8:
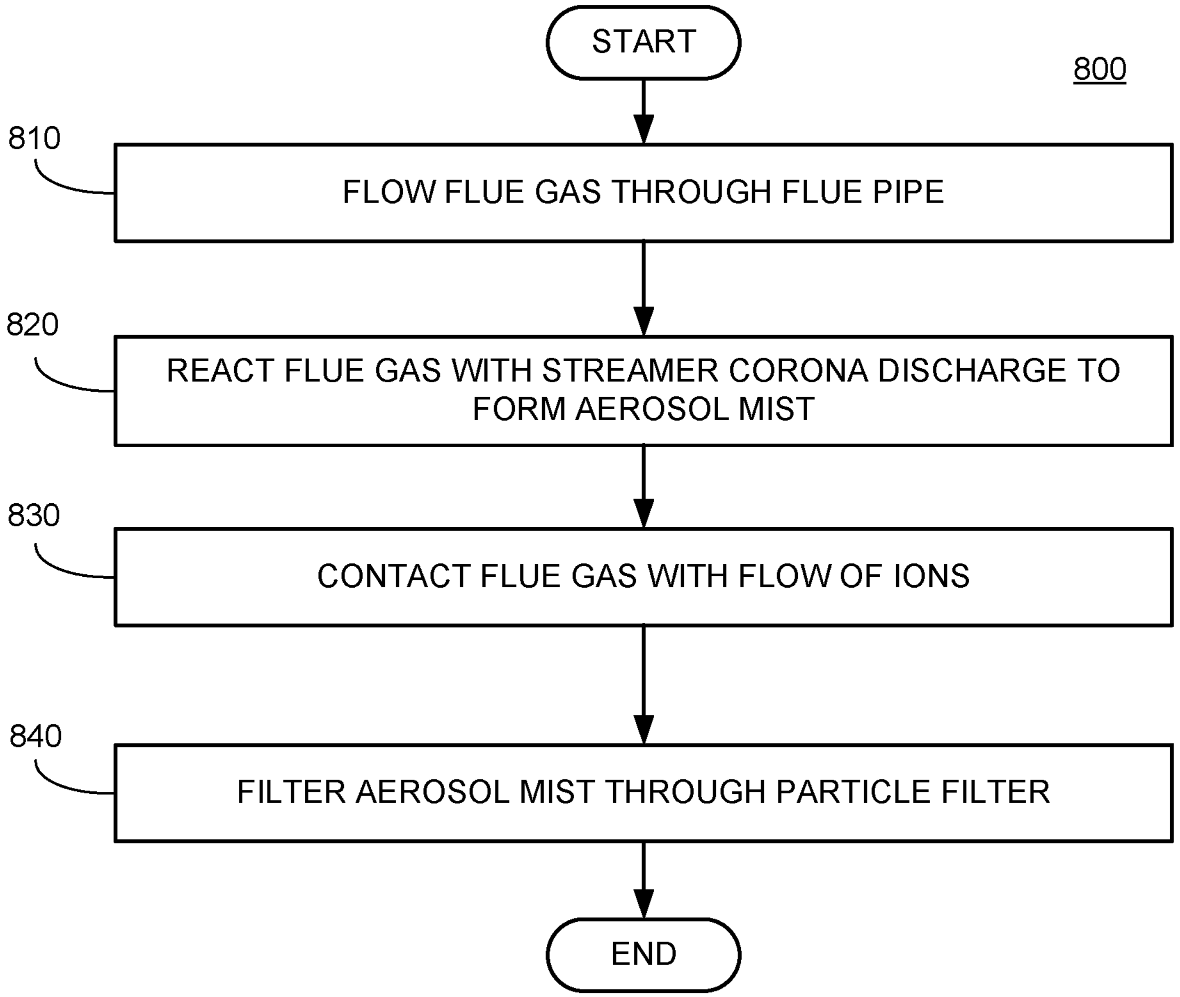
FIG. 8 is a flowchart of a method of purifying a flue gas, in accordance with the present disclosure.

FIG. 8 illustrates a method 800 of purifying a flue gas in accordance with the present disclosure. The method 800 can be carried out by the controller 600 and the flue pipe system 100. However, it is to be understood that the method 800 can be implemented using other similar systems, computing devices, general purpose computers, and the like. Also, it is understood that, while the method 800 is described with respect to the flue pipe system 100, the method 800 can be used in conjunction with other flue pipe systems.

In block 810, the method 800 can flow a flue gas through a flue pipe, such as the flue pipe system 100. The flue pipe can define a fluid flow path 110 through an interior volume 120 of the flue pipe, and the flue pipe can have an interior surface 132 defining the interior volume 120. The interior surface 132 can be opposite an exterior surface 134 of the flue pipe. The flue gas can comprise one or more of an oxide or a dioxide. The oxide or the dioxide can include a nitrogen oxide and/or a sulfur dioxide. For instance, the flue gas can comprise one or more components in the form of $NO_x$ and $SO_2$ molecules. The method 800 can then proceed on to block 820.

In block 820, the method can react the flue gas with a streamer corona discharge to form an aerosol mist comprising an acidic fluid. The streamer corona discharge can be produced by a first electrical circuit comprising the first electrode 142, the third electrode 146, and the voltage supply 150. The streamer corona discharge operates at small periods of high voltage pulses. The streamer discharge is formed by applying a voltage from the voltage supply 150 to first electrode 142 for a short duration period (e.g., about 200 ns). The short duration of the pulse prevents a spark breakdown, which would consume more power. Electrons ejected in the form of streamers can create active species and ions through inelastic collisions with the flue gas molecules. The active species (especially a hydroxyl radical, $^{\bullet}OH$) can promote the chemical reaction to convert $NO_x$ and $SO_2$ molecules into acids. The method 800 can then proceed on to block 830.

Reacting the flue gas with a first electrical circuit's pulsed streamer corona discharge can form active species and ions, which in turn promote chemical reactions in the flue gas molecules to form aerosol mist with acid particles. Additionally, reacting the flue gas with a second electrical circuit's pulsed streamer corona discharge forms active species and ions, which in turn promote chemical reaction in flue gas molecules to form aerosol mist with acid particles, the second electrical circuit comprising a first electrode, a second electrode, and a voltage supply. There are high voltage pulses provided at both first and second electrode, at the same time or at different times. The pulsed voltage might not be applied to second electrode 144, but it can be applied to the first electrode 142. These pulses of voltage can cause the pulsed streamer corona discharge, which can cause the formation of the active species and ions.

In block 830, the method 800 can contact the flue gas with a flow of ions along the interior surface 132 of the flue pipe thereby increasing a flow rate of the flue gas. The flow of ions can be produced by a second electrical circuit comprising the second electrode 142, the third electrode 146, and the voltage supply 150. This flow of ions can create an electrohydrodynamic flow. Based on the polarity of the second electrode 144 and the third electrode 146, the ions flow from the second electrode 144 to the third electrode 146 (and in a direction parallel to the fluid flow path, and therefore the flue gas flow). In such a manner, the flow of ions can effectively reduce the skin friction at the interior surface 132 and increase the flow rate of the flue gas in the flue pipe system 100. Therefore, the flow of ions can reduce the overall pressure drop in the flue pipe system and eliminate the need for induced or forced draft fans to encourage flue gas flow and/or reduce the size of induced or forced draft fans. The method 800 can then proceed on to block 840.

The second electrode 144 can receive a constant supply of DC voltage and, with a certain frequency (e.g., a predetermined frequency, a user-inputted frequency), the second electrode 144 can receive a high, pulsed voltage, such as the example shown in FIG. 7. Applying the constant DC voltage to the flue gas via the second electrical circuit can form a flow of ions along the interior surface of the flue pipe, where the second electrical circuit includes a first electrode (e.g., first electrode 142), a third electrode (e.g., third electrode 146), and the voltage supply. The ions formed during the pulsed streamer corona discharge at first and second electrode will move under the influence of constant DC voltage electrical field at second electrode.

In block 840, the method 800 can filter the aerosol mist through a particle filter 160 disposed in the interior volume 120 of the flue pipe. The particle filter 160 can be positioned such that the fluid flow path 110 is configured to flow therethrough. The particle filter 160 can comprise a mineral wool configured to neutralize an acidic fluid. Alternatively, or in addition, the particle filter 160 can be configured to entrap an aerosol mist. In such a manner, the particle filter 160 can entrap and/or neutralize the aerosol mist created by the flue gas interacting with the streamer corona discharge.

The particle filter 160 can comprise a variety of materials. Glass wool and mineral wool filters can be used to remove the acid mist and particle aerosols through several mechanisms, such as Brownian diffusion, impaction, and interception. The particle filter 160 can be placed at the end of the flue pipe while allowing for a larger flow area to reduce the pressure drop in the flue pipe. Slag wool (mineral wool), which is an inexpensive material used in filter applications, has shown to simultaneously remove acid mist and particle aerosols. This slag wool can allow for an acid-base reaction at the fiber surface, where the basic (high pH) CaO, MgO, NaO or $K_2O$ in the mineral fibers can leach out of the filter in presence of moisture and neutralize the acid mist to form salts at the fiber surface. The method 800 can then terminate after block 840. However, the method 800 can also proceed on to other method steps not shown.

Certain examples, embodiments, and implementations of the disclosed technology are described above with reference to block and flow diagrams of systems and methods according to examples or implementations of certain aspects of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some examples or implementations of the disclosed technology. That is, the disclosed technology includes the performance of some, or all steps of the methods and processes described herein in conjunction with the performance of additional steps not expressly discussed herein. Further, the present disclosure contemplates methods and processes in which some, but not all, steps described herein are performed.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom.

For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

EXAMPLE

The following exemplary use cases describe examples of a typical implementation of the disclosed subject matter. They are intended solely for explanatory purposes and not limitation.

A flue gas comprising $NO_x$ and $SO_2$ is flowed through a flue pipe system 100. When the flue gas flows through the interior volume 120, the flue gas can interact with the streamer corona discharge between the first electrode 142 and the third electrode 146. The interaction can cause the flue gas to form an aerosol mist. The aerosol mist can comprise one or more of an acid mist and/or aerosol particulates. The streamer corona discharge operates at small periods of high voltage pulses. The streamer discharge is formed by applying a voltage from the voltage supply 150 to first electrode 142 for a short duration period (about 200 ns). The short duration of the pulse prevents a spark breakdown, which would consume more power. The pulse to create the streamer corona discharge is pulsed according to FIG. 7. Electrons ejected in the form of streamers can create active species and ions through inelastic collisions with the flue gas molecules. The active species (especially a hydroxyl radical, $^{\bullet}OH$) can promote the chemical reaction to convert $NO_x$ and $SO_2$ molecules into acids.

The flue gas can flow through the flue pipe system 100 at a flow rate of approximately 10 cfm. The flue pipe system 100 can comprise a polyvinyl chloride (PVC) pipe having a diameter of approximately 3 in. The velocity of the flue gas through the flue pipe system 100 can be approximately 1 m/s. The power consumed by the second electrical circuit to create the flow of ions along the interior surface 132 of the flue pipe system is approximately 0.1 W/cfm, and the provided voltage from the voltage supply 150 to the second electrical circuit is approximately 24 kV. The maximum flow rate of the flue gas can be approximately 5 m/s with a power consumption of approximately 0.02 W/cfm in the flue pipe system 100.

Upon the complete conversion of the flue gases to acid mist and particle aerosols using the pulsed streamer corona discharge, the process can continue to scrub and neutralize the acid mist and particle aerosols before the gases are released to the environment. Glass wool and mineral wool filters can be used to remove the acid mist and particle aerosols through several mechanisms, such as Brownian diffusion, impaction, and interception. The filter material can be placed at the end of the flue pipe while allowing for a larger flow area to reduce the pressure drop in the flue pipe. Slag wool (mineral wool), which is an inexpensive material used in filter applications, has shown to simultaneously remove acid mist and particle aerosols. This slag wool can allow for an acid-base reaction at the fiber surface, where the basic (high pH) CaO, MgO, NaO or $K_2O$ in the mineral fibers can leach out of the filter in presence of moisture and neutralize the acid mist to form salts at the fiber surface.

What is claimed is:

1. A flue pipe system comprising:

a flue pipe comprising a nonconductive material, the flue pipe defining a fluid flow path through an interior volume, the flue pipe further comprising an interior surface defining the interior volume and an exterior surface opposite the interior surface;

a first electrode comprising a first conductive material, the first electrode located in the interior volume;

a second electrode comprising a second conductive material, the second electrode disposed on at least a portion of the interior surface of the flue pipe;

a third electrode comprising a third conductive material, the third electrode disposed on at least a portion of the interior surface of the flue pipe and connected to a grounding point; and a voltage supply connected to the first electrode and the second electrode; and a particle filter disposed in the interior volume of the flue pipe, wherein the fluid flow path is configured to flow through the particle filter.

2. The flue pipe system of claim 1, wherein a flue gas is configured to flow along the fluid flow path through the interior volume, the flue gas comprising one or more of an oxide, a dioxide, or a trioxide.

3. The flue pipe system of claim 2, wherein the one or more of the oxide, the dioxide, or the trioxide comprises one or more of nitrogen oxides or sulfur oxides.

4. The flue pipe system of claim 1, wherein the voltage supply is configured to form:

a first electrical circuit comprising the voltage supply, the first electrode, and the third electrode; and a second electrical circuit comprising the voltage supply, the second electrode, and the third electrode.

5. The flue pipe system of claim 4, wherein the first electrical circuit forms a streamer corona discharge between the first electrode and the third electrode in the interior volume, wherein the fluid flow path flows therethrough.

6. The flue pipe system of claim 5, wherein the flue gas interacts with the streamer corona discharge to create an aerosol mist.

7. The flue pipe system of claim 4, wherein the second electrical circuit forms a flow of ions between the second electrode and the third electrode along the interior surface of the flue pipe.

8. The flue pipe system of claim 1, wherein the particle filter comprises a mineral wool.

9. The flue pipe system of claim 8, wherein the particle filter is configured to entrap an aerosol mist, and the mineral wool is configured to neutralize an acidic fluid.

10. A method of purifying a flue gas, the method comprising:

flowing a flue gas through a flue pipe comprising a nonconductive material, the flue pipe defining a fluid flow path through an interior volume, the flue pipe having an interior surface defining the interior volume and an exterior surface opposite the interior surface;

reacting the flue gas with a first electrical circuit to form an aerosol mist, the first electrical circuit comprising a first electrode, a third electrode, and a voltage supply;

contacting the flue gas with a second electrical circuit to form a flow of ions along the interior surface of the pipe, the second electrical circuit comprising a second electrode, the third electrode, and the voltage supply; and filtering the aerosol mist through a particle filter disposed in the interior volume of the flue pipe, the particle filter comprising a mineral wool.

11. The method of claim 10, wherein the first electrode, the second electrode, and the third electrode comprise a conductive material.

12. The method of claim 10, wherein the second electrode is disposed on at least a portion of the interior surface of the flue pipe and connected to a grounding point.

13. The method of claim 10, wherein the first electrode is contained within the interior volume and parallel to at least a portion of the fluid flow path.

14. The method of claim 10, wherein the third electrode is disposed on at least a portion of the interior surface of the flue pipe.

15. The method of claim 10, wherein the reacting comprises forming, by the first electrical circuit, a streamer corona discharge between the first electrode and the third electrode in the interior volume, wherein the fluid flow path flows therethrough.

16. The method of claim 10, wherein the filtering comprises entrapping the aerosol mist in the particle filter and neutralizing the aerosol mist to eliminate an acidic fluid.

17. A method of purifying a flue gas, the method comprising:

flowing a flue gas comprising one or more of an oxide, a dioxide, or a trioxide through a flue pipe comprising a nonconductive material, the flue pipe defining a fluid flow path through an interior volume, the flue pipe having an interior surface defining the interior volume and an exterior surface opposite the interior surface;

reacting the flue gas with a streamer corona discharge to form an aerosol mist comprising an acidic fluid;

contacting the flue gas with a flow of ions along the interior surface of the pipe thereby increasing a flow rate of the flue gas; and filtering the aerosol mist through a particle filter disposed in the interior volume of the flue pipe, the particle filter comprising a mineral wool configured to entrap the aerosol mist and neutralize the acidic fluid.

18. The method of claim 17, wherein the one or more of the oxide, the dioxide, or the trioxide comprises one or more of nitrogen oxides or sulfur oxides.

19. The method of claim 17, wherein the streamer corona discharge is formed by:

a first electrode contained in the interior volume and being parallel to at least a portion of the fluid flow path;

a third electrode disposed on at least a portion of the interior surface of the flue pipe and connected to a grounding point; and a voltage supply.

20. The method of claim 19, wherein the flow of ions along the interior surface of the pipe is created by:

a second electrode disposed on at least a portion of the interior surface of the flue pipe;

the third electrode; and the voltage supply.

* * * * *